UNITED STATES PATENT OFFICE.

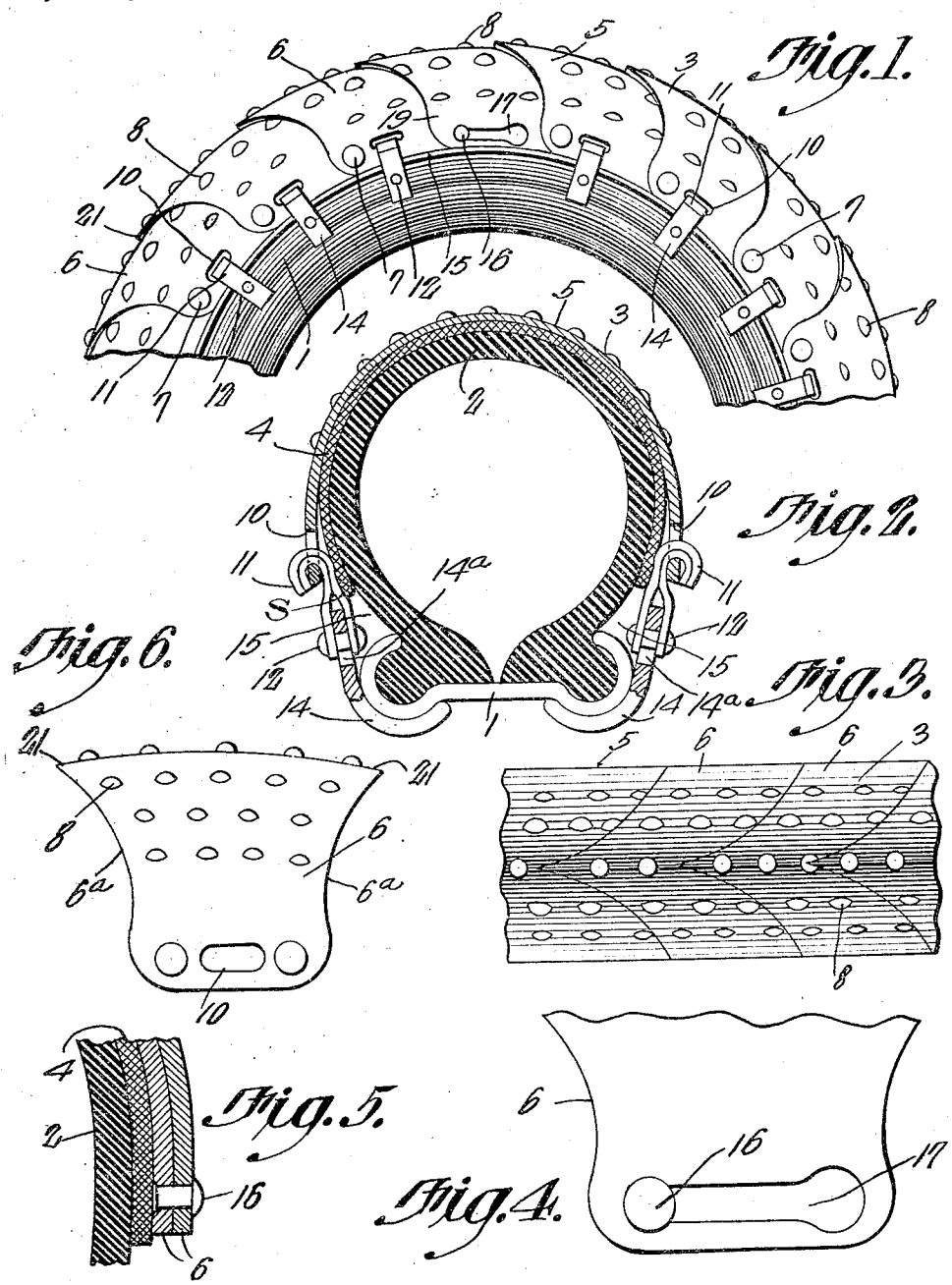

GEORGE W. SMITH, OF MONTICELLO, KENTUCKY.

TIRE-SHIELD.

1,122,652.  Specification of Letters Patent.  Patented Dec. 29, 1914.

Application filed October 22, 1912. Serial No. 727,262.

*To all whom it may concern:*

Be it known that I, GEORGE W. SMITH, a citizen of the United States, residing at Monticello, in the county of Wayne and State of Kentucky, have invented a new and useful Tire-Shield, of which the following is a specification.

The objects of the present invention are to provide a tire shield of novel and improved form; to provide novel means for assembling the shield with the rim of a vehicle wheel; and to provide a shield comprising pivotally connected elements which may be readily turned end for end, thereby doubling the effective life of the shield, the said elements, at the same time, affording a firm grip upon the earth.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 shows the invention in side elevation; Fig. 2 is a transverse section; Fig. 3 is a top plan; Fig. 4 is a detail side elevation of the locking device for holding the ends of the shield together; Fig. 5 is a transverse sectional detail showing a portion of the locking device; and Fig. 6 is a side elevation of one of the constituent members of the shield.

In the drawing, the numeral 1 indicates the wheel rim and the numeral 2 indicates the tire. The shield, denoted generally by the numeral 3, is a composite structure and comprises an inner member 4 which preferably is fashioned from canvas, leather, felt or the like, the member 4 being in direct contact with the tire 2. Superposed upon the inner member 4 of the shield is an outer member 5, comprising a plurality of sections 6, fashioned of spring steel or other resilient material. The sections 6 are pivotally united by means of rivets 7 or the like, the sections being equipped with anti-skid projections 8.

A means is provided for holding the shield upon the tire, and to this end, the members 6 are equipped with longitudinally extended slots 10 receiving outwardly extended double walled hooks 11. The constituent portions of the hooks 11 are united by pins 12, adapted to move in slots 14ª formed in inwardly extended hooks 14 which engage the edges of the wheel rim 1. The slidable union between the hooks 14 and 11, afforded by the pins 12 and the slots 14ª permits the tire to yield, without bringing the edges of the shield into contact with the clencher beads of the rim 1, it being noted that a space 15 exists between the longitudinal edges of the shield and the side portions of the rim 1.

Noting Figs. 4 and 1, it will be observed that one of the terminal members 6 is provided with a key-hole slot 17, receiving a headed stud 16 which projects from the other terminal member of the shield. The engagement of the stud 16 in the slot 17 permits the shield to expand circumferentially, when the tire 2 is inflated.

Referring to Fig. 6 it will be noted that the end edges of the members 6 of the shield are reversely curved as indicated at 6ª to define pointing grips 21 at each end of each member 6. The pointed grip 21 of one shield overlies the pointed grip of the next adjacent member 6, so that one pointed grip 21 of one member 6 is at all times located beneath one pointed grip of an adjacent member. The members 6 are symmetrical, and any one member may be turned end for end, thereby presenting a new grip 21, the worn or battered grip retiring beneath the projecting grip of an adjoining member. Thus, the life of the shield is practically doubled.

The grips 21, as will be understood are adapted to engage the earth and to enhance the tractile effect of the wheel.

Referring to Fig. 2 of the drawings it is to be observed that when the hook 11 is engaged in the opening 10 of the outer member 5 of the shield 3, a shoulder S on the hook 11 engages the edge of the inner member 4 of the shield to aid in holding the hook 11 in the opening.

Having thus described the invention, what is claimed is:—

In a device of the class described, a shield comprising an inner member, and an outer member having an opening; a hook engaged in the opening and having a shoulder engaging the edge of the inner member to aid in holding the hook in the opening; a rim engaging hook; and means for connecting the
5 hooks for relative sliding movement transversely of the shield.

In testimony that I claim the foregoing as my own, I have hereto affixed my signature in the presence of two witnesses.

GEORGE W. SMITH.

Witnesses:
JOHN F. DAUGHERTY,
W. L. BAKER.

Copies of this patent may be obtained for five cents each, by addressing the "Commissioner of Patents, Washington, D. C."